H. B. GABBE.
WINDOW WICKET OPERATING MECHANISM.
APPLICATION FILED APR. 15, 1914.
1,130,504.
Patented Mar. 2, 1915.
2 SHEETS—SHEET 1.
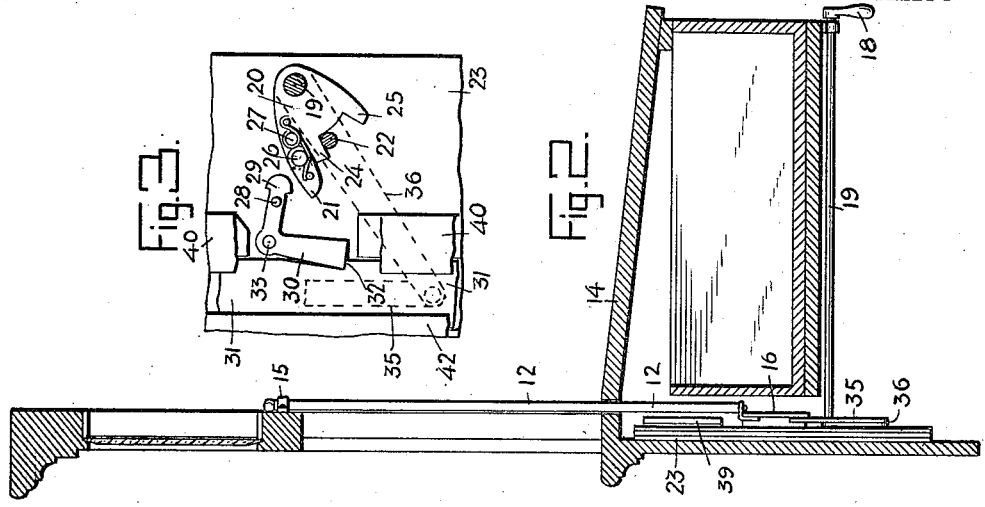
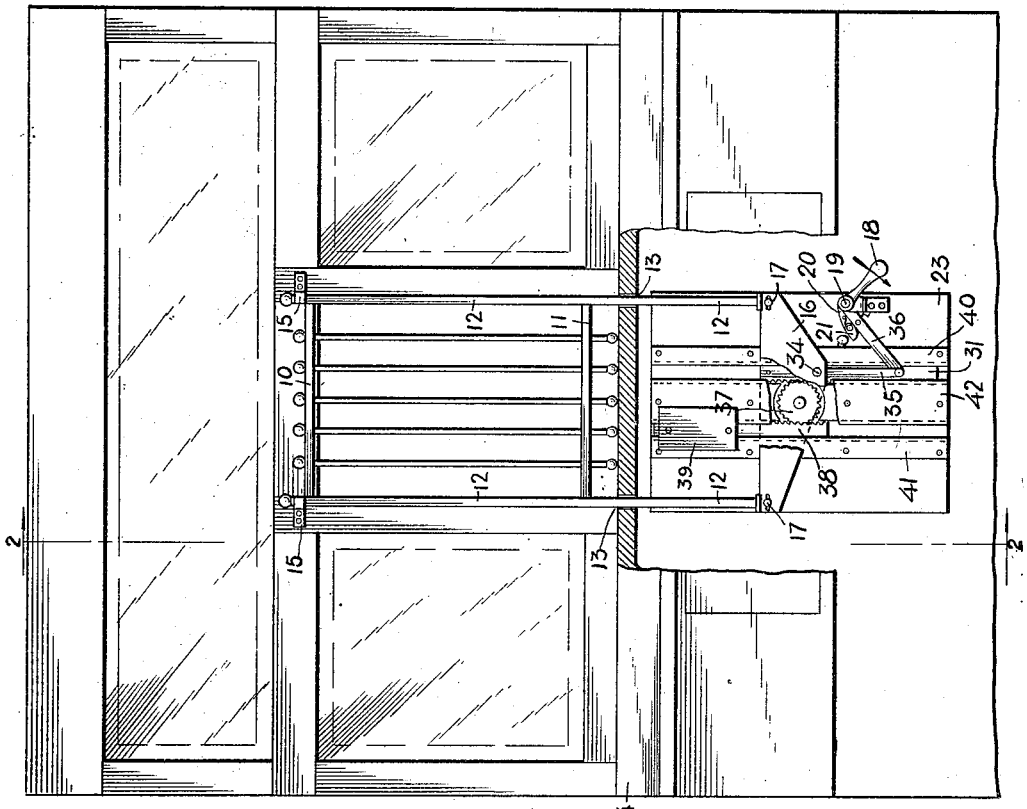
WITNESSES
INVENTOR
HYMAN B. GABBE
BY
ATTORNEYS H. B. GABBE.
WINDOW WICKET OPERATING MECHANISM.
APPLICATION FILED APR. 15, 1914.
1,130,504.
Patented Mar. 2, 1915.
2 SHEETS—SHEET 2.
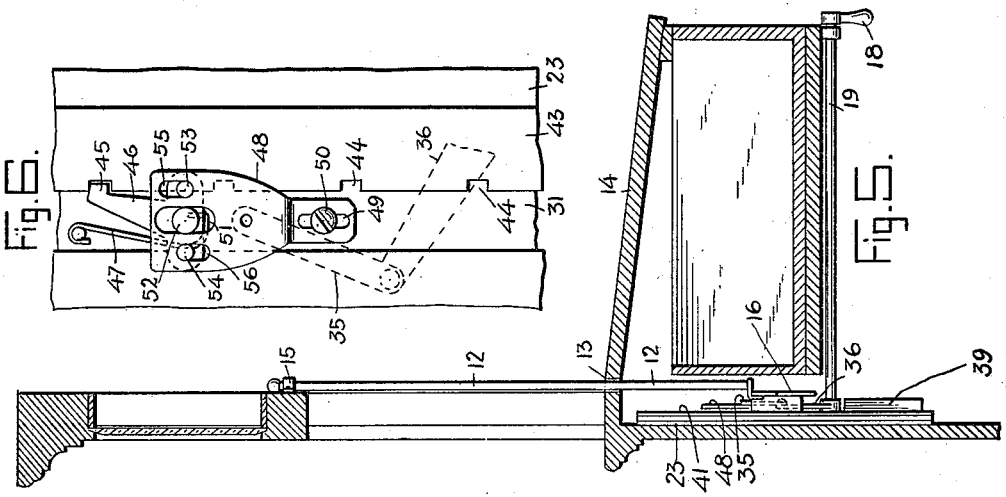
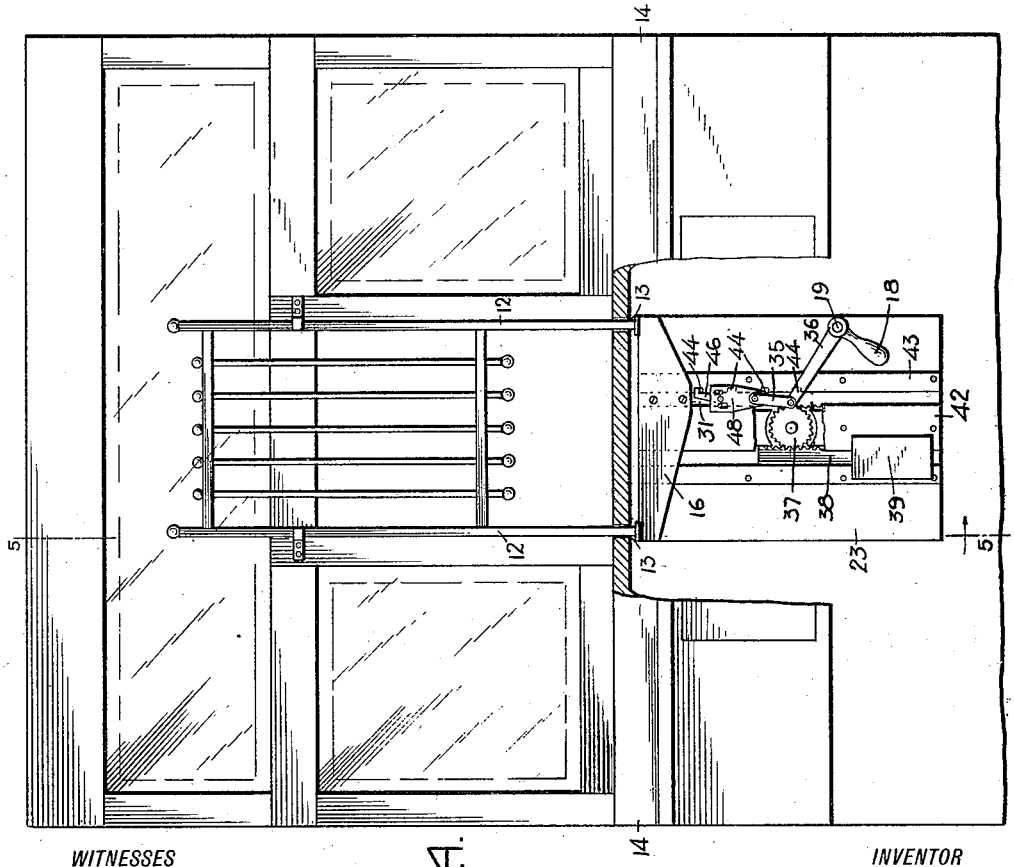
WITNESSES
INVENTOR
HYMAN B. GABBE
BY
ATTORNEYS

UNITED STATES PATENT OFFICE.

HYMAN B. GABBE, OF NEW YORK, N. Y.

WINDOW-WICKET-OPERATING MECHANISM.

1,130,504.   Specification of Letters Patent.   Patented Mar. 2, 1915.

Application filed April 15, 1914. Serial No. 832,118.

*To all whom it may concern:*

Be it known that I, HYMAN B. GABBE, a subject of the Czar of Russia, and a resident of the city of New York, borough of the Bronx, in the county of Bronx and State of New York, have invented a new and Improved Window-Wicket-Operating Mechanism, of which the following is a full, clear, and exact description.

Among the principal objects which the present invention has in view are: to provide a mechanism of the character indicated with simple and efficient locking mechanism to maintain the wicket in closed position; to provide a durable and readily-operated mechanism for moving said wicket to open and closed position; to provide simple and efficient means for maintaining said wicket in adjusted position; and to provide means for locking the wicket in a number of positions.

*Drawings.*—Figure 1 is an elevation showing the inner side of a cashier's counter having a wicket and operating mechanism therefor constructed and arranged in accordance with the present invention, the counter being partly cut away to show the construction and disposition of said wicket and mechanism; Fig. 2 is a vertical section taken on the line 2—2 in Fig. 1; Fig. 3 is a detail view on an enlarged scale, showing the locking dog and operating latch therefor constructed and arranged in accordance with the preferred form of the invention; Fig. 4 is a view similar to Fig. 1, showing a wicket and a modified form of the invention as embodied in a mechanism for operating said wicket; the wicket being shown in the elevated position. Fig. 5 is a vertical section taken as on the line 5—5 in Fig. 4, the wicket being shown as closed; and Fig. 6 is a detail view, on an enlarged scale, of the locking dog and releasing mechanism therefor, constructed and arranged in accordance with the modified form of mechanism.

*Description.*—The wicket shown in the drawing is provided with a top rail 10 and a bottom rail 11 connecting structural stiles 12, which are extended, in service, through holes 13 formed in the counter shelf 14. The holes 13, in conjunction with clips 15, serve as guides for controlling the movement of the wicket. The lower ends of the stiles 12 are connected by a cross beam 16, being united thereto by adjustable screws and clips 17. The beam 16 constitutes the immediate support for the wicket and serves to raise and lower the same when moved thereto by the operation of a handle 18.

The handle 18, as best seen in Figs. 2 and 5 of the drawings, is disposed at the inner edge of the counter of which the shelf 14 is the top, and is fixedly mounted on a shaft 19. At the opposite end of the shaft 19 is fixedly mounted a latch plate 20. The latch plate 20 supports a latch 21, which is mounted thereon by a pivot 26. The edge of the plate 20 is recessed, as best shown in Fig. 3 of the drawings, to receive a pin 22 and to provide extensions 24 and 25 wherewith said pin is engaged by the plate 20. The pin 22 is extended from the side of a rocking arm pivotally mounted on the shaft 19. The length of the recess between the extensions 24 and 25 is such as to provide the necessary independent movement of the plate 20 before it engages the pin 22.

The latch 21 has a pivot 26 and a positioning spring 27. The office of the spring 27 is to normally hold the latch in the position shown in Fig. 3 of the drawings, where it rests on the extension 24. The end of the latch 21 is extended to engage a pin 28 on a weighted arm 29, which arm normally functions to swing a dog 30 toward a rack bar 31 to engage a shoulder 32 formed on the edge of said rack bar. The dog 30 swings on a pin 33, which is fixedly mounted on the bed plate 23.

The rack bar 31 is rigidly connected by means of a rivet post 34, with the beam 16. The post 34 likewise forms a bearing for the end of a link 35. The link 35 and the arm 36 form transmission means for moving the beam 16 and wicket connected therewith. The arm 36 is pivotally connected with the shaft 19, and is rotated thereby only when the pin 22, mounted on the arm 36, is engaged by the extensions 24 or 25. The lost movement in the engagement of the extensions and pin is utilized in lifting the arm 29 and in disengaging the dog 30 from the rack bar 31, before lifting the said bar.

The wicket and parts connected therewith, are normally supported on the trunnions of a gear wheel 37. The wheel 37 is counterbalanced by an auxiliary rack bar 38 and a counterweight 39. The weight is mounted in this manner to economize in space, the said weight never passing below the bed plate 23.

The teeth of the wheel 37 are meshed with gear teeth formed on the rack bars 31 and 38, and by means of the counterweight 39 the balance of the wheel 37 on its trunnions is perfectly established and maintained. It will be understood in this connection that the proportion of balance exerted by the weight 39 on the wheel 37 may be optionally varied. The bars 31 and 38 are guided in their movement by overhanging slats 40 and 41 and a double overhanging slat 42, which latter slat covers protectively the wheel 37.

In the modified form of the invention shown in Figs. 4 to 6 inclusive, there is substituted for the slat 40 a rail 43. The rail 43 differs in construction from the slat 40, in that it is provided at suitable intervals with recesses 44, as best seen in Fig. 6 of the drawings. Two or more of these recesses are provided, the number being dictated by the design or installation. The recesses 44 are provided to receive the head 45 of a latch dog 46 when the same is moved into register therewith. The dog 46 has a seating spring 47, the office whereof is to move the head 45 into any or each of the recesses 44 when said head is moved opposite said recesses. Unlike the dog 30 in the preferred form, which is definitely positioned on the bed plate 23 to engage a moving member; to wit, the rack bar 31. The dog 46 is pivotally mounted upon said rack bar to engage the recesses 44 in the rail 43 which is fixed on the bed plate 23. In the modified form the link 35 is pivotally connected to a slide plate 48. The plate 48 is slidably mounted on the rack bar 31 by means of pins 50 and 52 and slots 49 and 51. The plate 48 is widened in the portion containing the slot 51 to extend above the dog 46. The dog is pivoted on the pin 52. Operating pins 53 and 54 extend through slots 55 and 56, respectively.

The slots 55 and 56 are relatively staggered, as seen best in Fig. 6 of the drawings, so that in the normal position of the plate 48 and dog 46, the pin 53 rests at the bottom of the slot 55, and the pin 54 rests at the top of the slot 56. The result of this construction is that if the plate 48 be moved from the position shown in Fig. 6 of the drawings, either upward or downward, the dog 46 is rocked on the pin 52 to remove the head 45 from any of the recesses 44, and this prior to the engagement of the plate 48 and pin 52.

As seen best in Fig. 4 of the drawings, the recesses 44 are spaced apart to permit a limited movement for the wicket, and to automatically lock the same in adjusted position.

*Operation.*—When a wicket of the character indicated is provided with an operating mechanism such as described, and as shown in the accompanying drawings, the operation is as follows: The closed position is the normal one. Such wickets are usually provided to guard cash windows opening adjacent where moneys or treasures are stored and from whence they may be purloined or abstracted rapidly or secretively. When necessary for the authorized agent at the inner side of the counter shelf 14 to open the wicket, this is effected by moving the handle 18 to rotate the shaft 19. If the construction is of the preferred form, the plate 20 is rocked with the shaft 19, and the latch 21 preliminarily positively engages the pin 28 and retracts the dog 30 from engagement with the shoulder 32 on the rack bar 31. The extension 25 then engages the pin 22 on the arm 36. The rack bar 31 is now lifted, carrying with it the beam 16. This operation is facilitated by the counterbalancing of the weight of the wicket and parts connected therewith on the bar 31, by the weight 39. It will be understood that in this form of the invention, after the release of the rack bar 31 by the dog 30, the wicket is free to be lifted to the extreme position. From the raised position it is normally depressed by the attendant operating the mechanism by means of the handle 18, thereby rocking the shaft 19 back to its initial or normal position. It will be seen that by reason of the overbalancing weight of the arm 29, the dog 30 is constantly alert to engage the shoulder 32. It will also be seen that the pin 28 stands in the path of the latch 21, which, in order that the plate 20 may return to the initial position, is required to yield. The spring 27 permits the necessary yield of the latch 21, which having passed the pin, snaps into the normal position as shown in Fig. 3 of the drawings. It will now be seen that the wicket is closed, and that the rack bar 31 has been lowered to a position where the dog 30 has engaged the rack bar 31 to lock the same in position. If the wicket is provided with a mechanism constructed in accordance with the modified form of the invention, the operator may move the handle 18 and shaft 19 connected therewith until the rack bar 31 has been lifted to where the head 45 of the dog 46 enters the first, second, third or fourth recess, as the case may be. When the strain on the handle is relieved, the spring 47 rocks the dog 46 to engage the recess 44. Thus when employing the form of operating mechanism shown in Figs. 4 to 6 inclusive, the wicket may be locked in any adjusted position provided for by the recesses 44. It will be observed that in both forms of mechanism, to endeavor to lift the wicket operates to force the latch head into closer engagement with the bar 31 or rail 43 to hold the wicket the more firmly. Also it will be observed that the lifting and depressing impulse is imparted to the structure immediately by the shaft 19, the arm 36 and the link 35, and that the wheel 37 supports the structure only after the same has been brought to rest.

Claims:

1. A mechanism as characterized, comprising a wicket; a reciprocating supporting member therefor, said member having an engaging shoulder formed in the edge thereof; a dog for engaging said shoulder; and a manually-movable latch for engaging said dog to release the same from engagement with said shoulder, said latch yielding in the retractive movement thereof.

2. A mechanism as characterized, comprising a wicket; a reciprocating supporting member therefor, said member having an engaging shoulder formed in the edge thereof; a dog for engaging said shoulder; a manually-rotatable latch plate; a latch pivotally mounted on said plate to extend into the path of, to engage, said dog; and resilient means for holding said latch in operative position to yield when said latch is moved in one direction only.

3. A mechanism as characterized, comprising a wicket; a reciprocating bar operatively connected with said wicket to support the same; means for governing the movement of said bar, embodying a multi-recessed member adjacent said bar; a latch for engaging said recessed member, said latch being pivotally mounted on said bar; manually-operative means for reciprocating said bar; a sliding plate operatively connecting said bar and manually-operative means; and means embodied in said plate for rotating said latch prior to the movement of said bar.

4. A mechanism as characterized, comprising a wicket; a reciprocating bar operatively connected with said wicket to support the same; means for governing the movement of said bar, embodying a multi-recessed member adjacent said bar; a latch for engaging said recessed member, said latch being pivotally mounted on said bar; manually-operative means for reciprocating said bar; a sliding plate operatively connecting said bar and manually-operative means; and means operatively connecting said latch and said plate, embodying a plurality of pins projecting from the sides of the pivot thereof, and a plurality of elongated slots formed in said plates to engage said pins, said slots being disposed in relatively staggered relation to extend in opposite directions from a line incorporating said pins and the pivot of said latch.

5. A mechanism as characterized, comprising a wicket; a reciprocating bar operatively connected with said wicket to support the same; means for governing the movement of said bar, embodying a multi-recessed member adjacent said bar; a latch for engaging said recessed member, said latch being pivotally mounted on said bar; manually-operative means for reciprocating said bar; a sliding plate operatively connecting said bar and manually-operative means; and means operatively connecting said latch and said plate, embodying a plurality of pins projecting from the side of said latch at opposite sides of the pivot thereof, and a plurality of slots engaging said pins, the engaging ends of both of said slots engaging their respective pins when said latch is in locked position, both of said slots having extension from the engaging end in relatively opposite directions to permit the free movement in each, of its respective pin when said latch is operated upon by means of the other slot.

In testimony whereof I have signed my name to this specification in the presence of two subscribing witnesses.

HYMAN B. GABBE.

Witnesses:
  E. F. MURDOCK,
  PHILIP D. ROLLHAUS.

Copies of this patent may be obtained for five cents each, by addressing the "Commissioner of Patents, Washington, D. C."